(12) United States Patent
Enomoto

(10) Patent No.: US 8,325,427 B2
(45) Date of Patent: Dec. 4, 2012

(54) ZOOM LENS SYSTEM

(75) Inventor: Takashi Enomoto, Chiba (JP)

(73) Assignee: Pentax Ricoh Imaging Company, Ltd., Tokyo (JP)

(*) Notice: Subject to any disclaimer, the term of this patent is extended or adjusted under 35 U.S.C. 154(b) by 56 days.

(21) Appl. No.: 13/114,348

(22) Filed: May 24, 2011

(65) Prior Publication Data

US 2011/0292519 A1    Dec. 1, 2011

(30) Foreign Application Priority Data

May 26, 2010 (JP) ................. 2010-120403

(51) Int. Cl.
*G02B 15/14* (2006.01)
(52) U.S. Cl. .................................... 359/691
(58) Field of Classification Search ........... 359/691, 359/740, 793
See application file for complete search history.

(56) References Cited

U.S. PATENT DOCUMENTS

| | | | |
|---|---|---|---|
| 6,014,268 A | 1/2000 | Yahagi | |
| 6,819,499 B2* | 11/2004 | Watanabe | 359/689 |
| 2006/0018034 A1 | 1/2006 | Enomoto | |

FOREIGN PATENT DOCUMENTS

| | | |
|---|---|---|
| JP | 03-255416 A | 11/1991 |
| JP | 08-254653 A | 10/1996 |
| JP | 2006-39094 A | 2/2006 |

* cited by examiner

*Primary Examiner* — Joseph P Martinez
(74) *Attorney, Agent, or Firm* — Greenblum & Bernstein P.L.C.

(57) ABSTRACT

A zoom lens system includes a negative first lens group, a diaphragm, and a positive second lens group. The following conditions (1) and (2) are satisfied:

$$5.2 < (d12W - d12T)/(mT/mW) < 7 \quad (1),$$

and $$0.3 < SF < 0.7 \quad (2),$$

wherein d12W and d12T designate the distance from the surface closest to the image side of the first lens group to the surface closest to the object side of the second lens group, at the short and long focal length extremities, mT and mW designate the lateral magnification of the second lens group at the long and short focal length extremities, SF designates the shape factor of the positive lens element closest to the object side within the second lens group, and R2 and R1 designate the radius of curvature of the surface on the image side and object side, respectively, of the positive lens element closest to the object side within the second lens group.

7 Claims, 7 Drawing Sheets

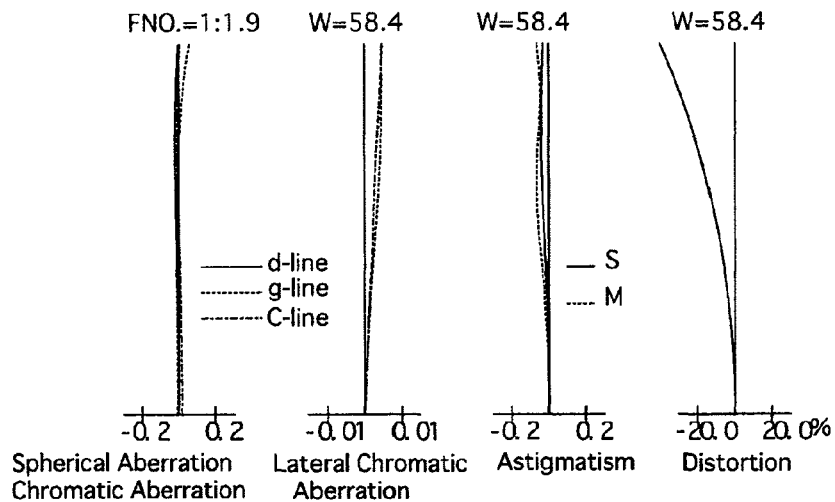
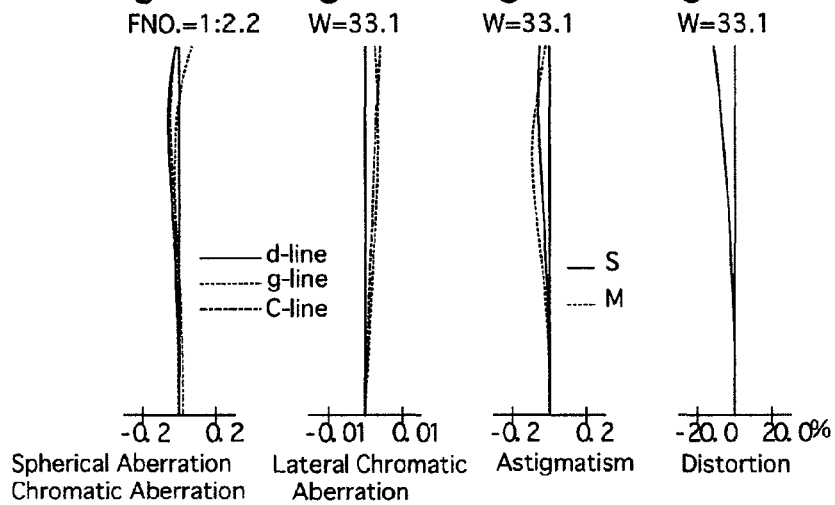
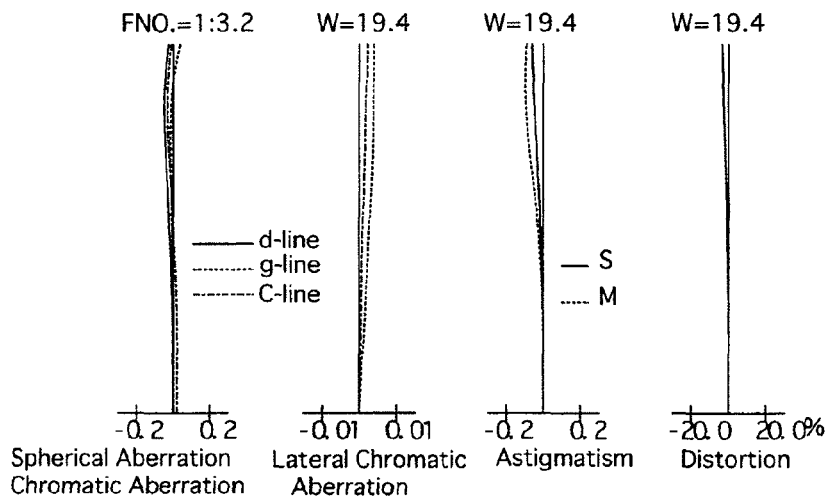

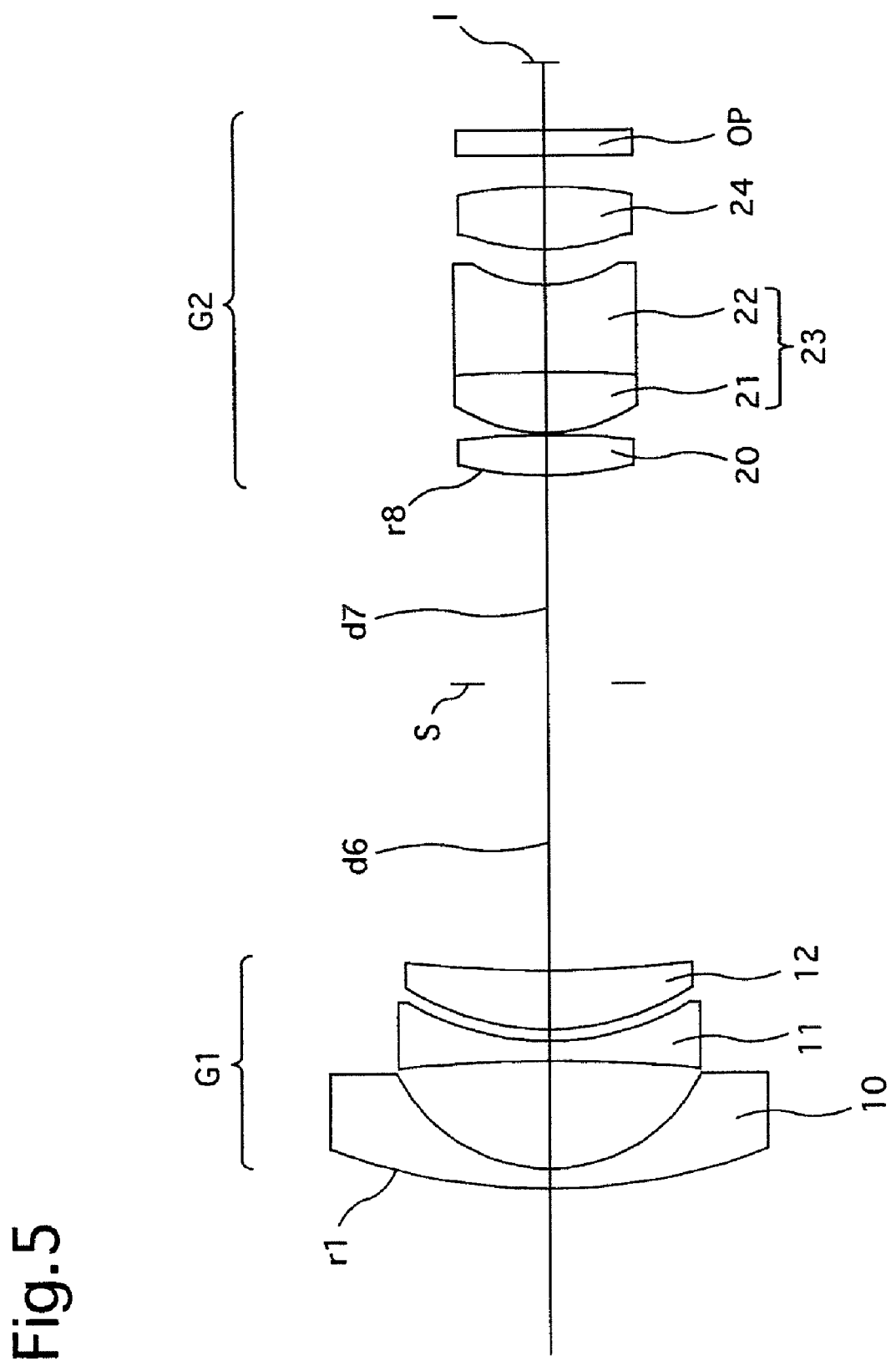

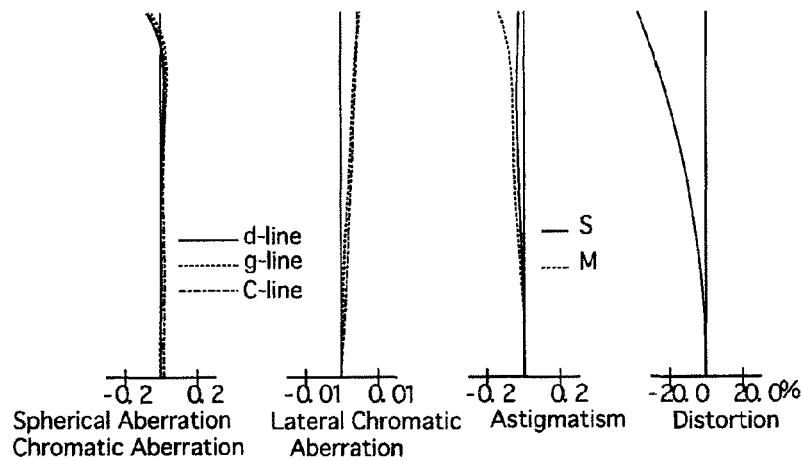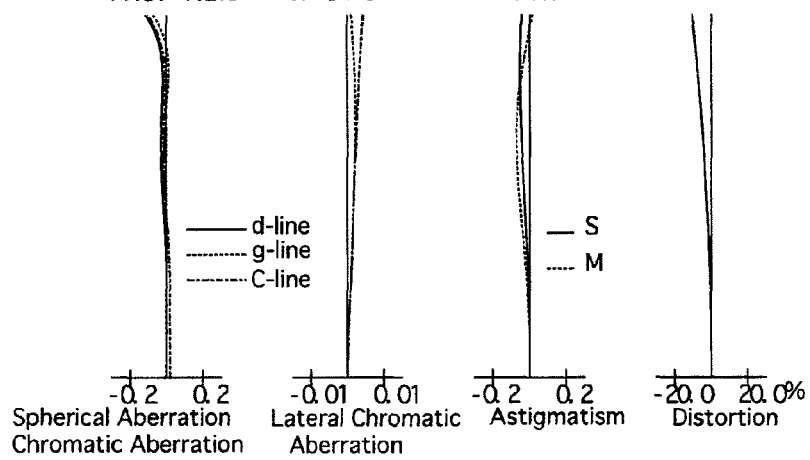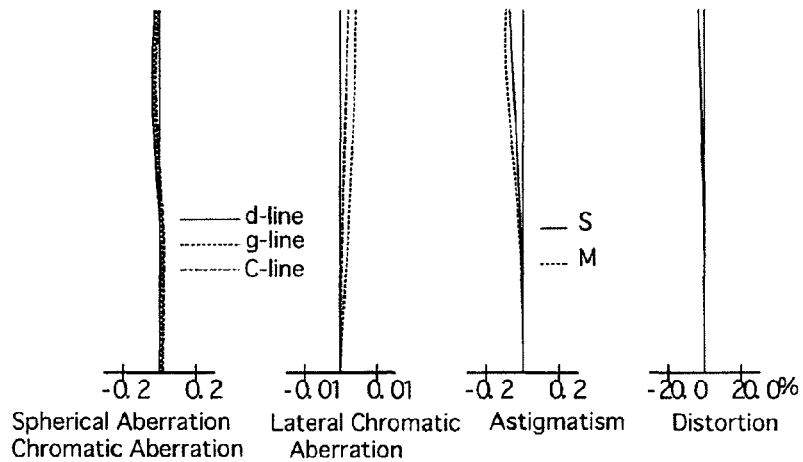

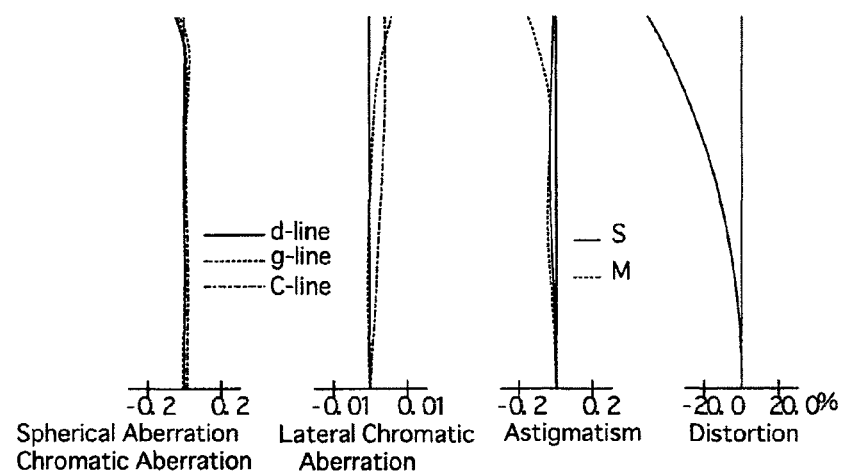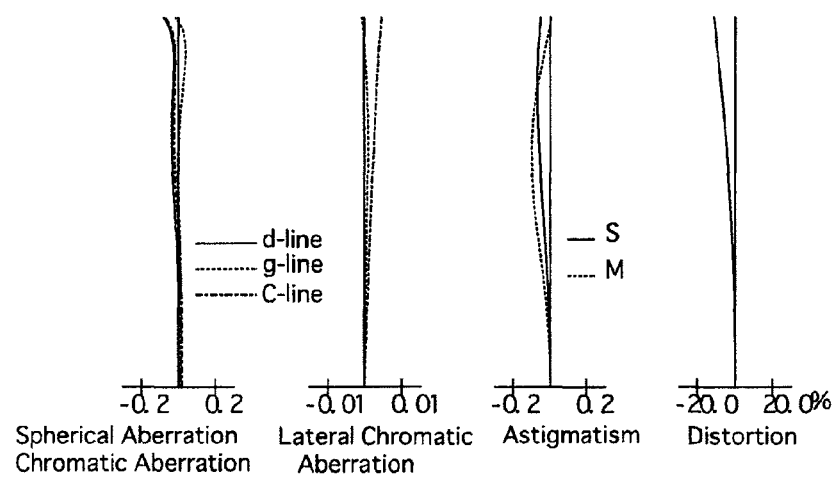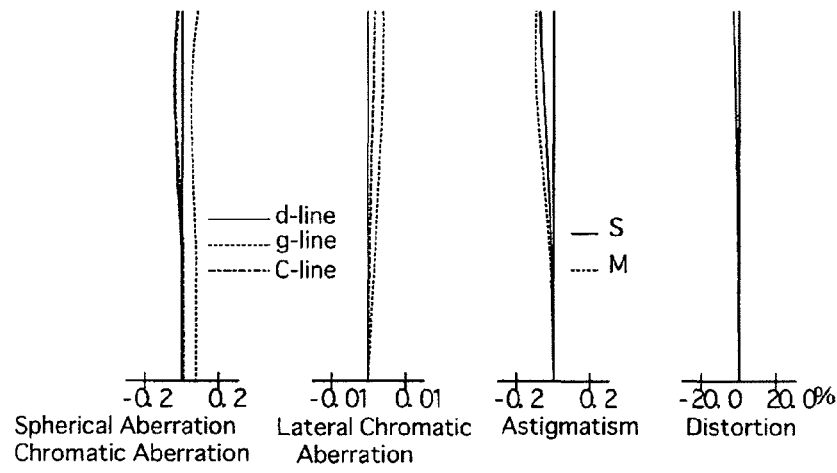

ZOOM LENS SYSTEM

BACKGROUND OF THE INVENTION

1. Field of the Invention

The present invention relates to a zoom lens system that constitutes a miniaturized zoom optical system for a video camera or a electronic still camera that use an image sensor such as a CCD or a CMOS, etc., especially for use in a surveillance camera.

2. Description of Related Art

In recent years, there has been an increasing demand for small surveillance cameras in offices and in train stations, etc. Conventionally, a surveillance camera is provided with a fixed focal-length lens selected from a plurality of fixed focal-length lenses in accordance with usage. However, in order to handle various requirements in regard to installation of such a surveillance camera, a zoom lens has been in demand. Recently, mainly retrofocus zoom lens systems that are low-pixelization compatible, i.e., compatible with a VGA (Video Graphics Array: 640×480 pixel image resolution), etc., have become predominant.

An example of a conventional zoom lens system is disclosed in Japanese Unexamined Patent Publication No. 2006-39094.

SUMMARY OF THE INVENTION

However, even in zoom lens systems for small surveillance cameras, demands are being made for achieving further miniaturization for accommodating the zoom lens system within the surveillance camera dome, increasing the zoom ratio from approximately 2:1 of a conventional zoom lens system to a zoom ratio of approximately 3:1, providing a speed defined by an f-number of 2.0 or less, and higher optical quality (so as to handle higher pixelization).

The present invention provides a miniaturized, fast and high quality zoom lens system for a small surveillance camera having a zoom ratio of approximately 3:1.

According to an aspect of the present invention, a zoom lens system is provided, including a negative first lens group, a diaphragm, and a positive second lens group, in that order from the object side, wherein upon zooming from the short focal length extremity to the long focal length extremity, the first lens group and the second lens group move in the optical axis direction while decreasing the distance therebetween. The first lens group includes a negative lens element, a negative lens element and a positive lens element, in that order from the object side. The second lens group includes a positive lens element, a cemented lens that is formed from a positive lens element and a negative lens element, and a positive lens element, in that order from the object side. The following conditions (1) and (2) are satisfied:

$$5.2<(d12W-d12T)/(mT/mW)<7 \quad (1), \text{ and}$$

$$0.3<SF<0.7 \quad (2),$$

wherein d12W designates the distance along the optical axis from the surface closest to the image side of the first lens group to the surface closest to the object side of the second lens group at the short focal length extremity, d12T designates the distance along the optical axis from the surface closest to the image side of the first lens group to the surface closest to the object side of the second lens group at the long focal length extremity, mT designates the lateral magnification of the second lens group at the long focal length extremity, mW designates the lateral magnification of the second lens group at the short focal length extremity, SF designates the shape factor of the positive lens element that is provided closest to the object side within the second lens group, SF=(R2+R1)/(R2−R1), R2 designates the radius of curvature of the surface on the image side of the positive lens element that is provided closest to the object side within the second lens group, and R1 designates the radius of curvature of the surface on the object side of the positive lens element that is provided closest to the object side within the second lens group.

It is desirable for the following condition (3) to be satisfied:

$$2.5<f2G/fW<3.2 \quad (3),$$

wherein f2G designates the focal length of the second lens group, and fW designates the focal length of the entire the zoom lens system at the short focal length extremity.

It is desirable for the following conditions (4) and (5) to be satisfied:

$$0<fW/fc<0.1 \quad (4); \text{ and}$$

$$15<vP-vN \quad (5),$$

wherein fW designates the focal length of the entire the zoom lens system at the short focal length extremity, fc=rc/(nP−nN), rc designates the radius of curvature of the bonding surface of the cemented lens which is provided in the second lens group, nP designates the refractive index at the d-line of the positive lens element of the cemented lens which is provided in the second lens group, nN designates the refractive index at the d-line of the negative lens element of the cemented lens which is provided in the second lens group, vP designates the Abbe number with respect to the d-line of the positive lens element of the cemented lens which is provided in the second lens group, and vN designates the Abbe number with respect to the d-line of the negative lens element of the cemented lens which is provided in the second lens group.

It is desirable for the following condition (6) to be satisfied:

$$3<\Sigma d2G/fW<4 \quad (6),$$

wherein Σd2G designates the distance along optical axis from the surface closest to the object side of the second lens group to the surface closest to the image side of the second lens group, and fW designates the focal length of the entire the zoom lens system at the short focal length extremity.

It is desirable for the diaphragm to be provided at a fixed location on the optical axis so as to remain stationary without changing the distance between the image plane and the diaphragm during zooming.

It is desirable for the second negative lens element from the object side of the first lens group to include a biconcave negative lens element.

It is desirable for the following condition (7) to be satisfied:

$$0.8<|f1G|/f2G<1.2 \quad (7),$$

wherein f1G designates the focal length of the first lens group, and f2G designates the focal length of the second lens group.

According to another embodiment of the present invention, a zoom lens system is provided, including a negative first lens group, a diaphragm, and a positive second lens group, in that order from the object side, wherein upon zooming from the short focal length extremity to the long focal length extremity, the first lens group and the second lens group move in the optical axis direction while decreasing the distance therebetween. The first lens group includes a negative lens element, a negative lens element and a positive lens element, in that order from the object side. The second lens group includes a positive lens element, a cemented lens that is formed from a positive lens element and a negative lens element, and a positive lens element, in that order from the object side. The following conditions (1) and (3) are satisfied:

$$5.2 < (d12W - d12T)/(mT/mW) < 7 \quad (1), \text{ and}$$

$$2.5 < f2G/fW < 3.2 \quad (3),$$

wherein d12W designates the distance along the optical axis from the surface closest to the image side of the first lens group to the surface closest to the object side of the second lens group at the short focal length extremity, d12T designates the distance along the optical axis from the surface closest to the image side of the first lens group to the surface closest to the object side of the second lens group at the long focal length extremity, mT designates the lateral magnification of the second lens group at the long focal length extremity, mW designates the lateral magnification of the second lens group at the short focal length extremity, f2G designates the focal length of the second lens group, and fW designates the focal length of the entire the zoom lens system at the short focal length extremity.

According to another embodiment of the present invention, a zoom lens system is provided, including a negative first lens group, a diaphragm, and a positive second lens group, in that order from the object side, wherein upon zooming from the short focal length extremity to the long focal length extremity, the first lens group and the second lens group move in the optical axis direction while decreasing the distance therebetween. The first lens group includes a negative lens element, a negative lens element and a positive lens element, in that order from the object side. The second lens group includes a positive lens element, a cemented lens that is formed from a positive lens element and a negative lens element, and a positive lens element, in that order from the object side. The following conditions (2) and (3) are satisfied:

$$0.3 < SF < 0.7 \quad (2), \text{ and}$$

$$2.5 < f2G/fW < 3.2 \quad (3),$$

wherein SF designates the shape factor of the positive lens element that is provided closest to the object side within the second lens group, SF=(R2+R1)/(R2−R1), R2 designates the radius of curvature of the surface on the image side of the positive lens element that is provided closest to the object side within the second lens group, R1 designates the radius of curvature of the surface on the object side of the positive lens element that is provided closest to the object side within the second lens group, f2G designates the focal length of the second lens group, and fW designates the focal length of the entire the zoom lens system at the short focal length extremity.

According to the present invention, a miniaturized, fast and high quality zoom lens system for a small surveillance camera having a zoom ratio of approximately 3:1 can be achieved.

The present disclosure relates to subject matter contained in Japanese Patent Application No. 2010-120403 (filed on May 26, 2010) which is expressly incorporated herein in its entirety.

BRIEF DESCRIPTION OF THE DRAWINGS

The present invention will be discussed below in detail with reference to the accompanying drawings, in which:

FIGS. 2A, 2B, 2C and 2D show various aberrations that occurred in the lens arrangement shown in FIG. 1 at the short focal length extremity when focused on an object at infinity;

FIGS. 3A, 3B, 3C and 3D show various aberrations that occurred in the lens arrangement shown in FIG. 1 at an intermediate focal length when focused on an object at infinity;

FIGS. 4A, 4B, 4C and 4D show various aberrations that occurred in the lens arrangement shown in FIG. 1 at the long focal length extremity when focused on an object at infinity;

FIG. 5 shows a lens arrangement of a second numerical embodiment of a zoom lens system according to the present invention;

FIGS. 6A, 6B, 6C and 6D show various aberrations that occurred in the lens arrangement shown in FIG. 5 at the short focal length extremity when focused on an object at infinity;

FIGS. 7A, 7B, 7C and 7D show various aberrations that occurred in the lens arrangement shown in FIG. 5 at an intermediate focal length when focused on an object at infinity;

FIGS. 8A, 8B, 8C and 8D show various aberrations that occurred in the lens arrangement shown in FIG. 5 at the long focal length extremity when focused on an object at infinity;

FIGS. 10A, 10B, 10C and 10D show various aberrations that occurred in the lens arrangement shown in FIG. 9 at the short focal length extremity when focused on an object at infinity;

FIGS. 11A, 11B, 11C and 11D show various aberrations that occurred in the lens arrangement shown in FIG. 9 at an intermediate focal length when focused on an object at infinity;

FIGS. 12A, 12B, 12C and 12D show various aberrations that occurred in the lens arrangement shown in FIG. 9 at the long focal length extremity when focused on an object at infinity.

DESCRIPTION OF THE PREFERRED EMBODIMENTS

Figure 13:
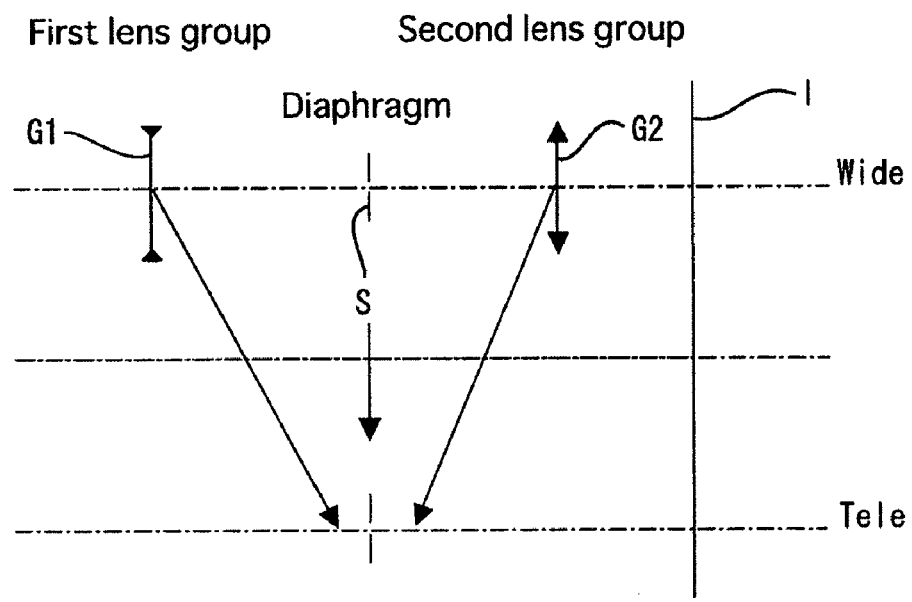
FIG. 13 shows a zoom path of the zoom lens system according to the present invention.

The zoom lens system according to the present invention is configured of, as shown in the zoom path diagram of FIG. 13, a negative first lens group G1, a diaphragm S, and a positive second lens group G2, in that order from the object side.

Upon zooming from the short focal length extremity (Wide) to the long focal length extremity (Tele), the distance between the first lens group G1 and the second lens group G2 is decreased, while the first lens group G1 moves toward the image side and the second lens group G2 moves toward the object side. Upon zooming, the diaphragm S is provided at a fixed position on the optical axis so that the distance between the diaphragm S and the image plane I does not change. Since the distance from the diaphragm S to the first lens group G1 and the distance from the diaphragm S to the second lens group G2 can both be enlarged at the short focal length extremity due to the diaphragm S (diaphragm unit) being provided at a fixed position, this is advantageous for providing a wide angle-of-view and for correcting abaxial aberration.

Figure 1:
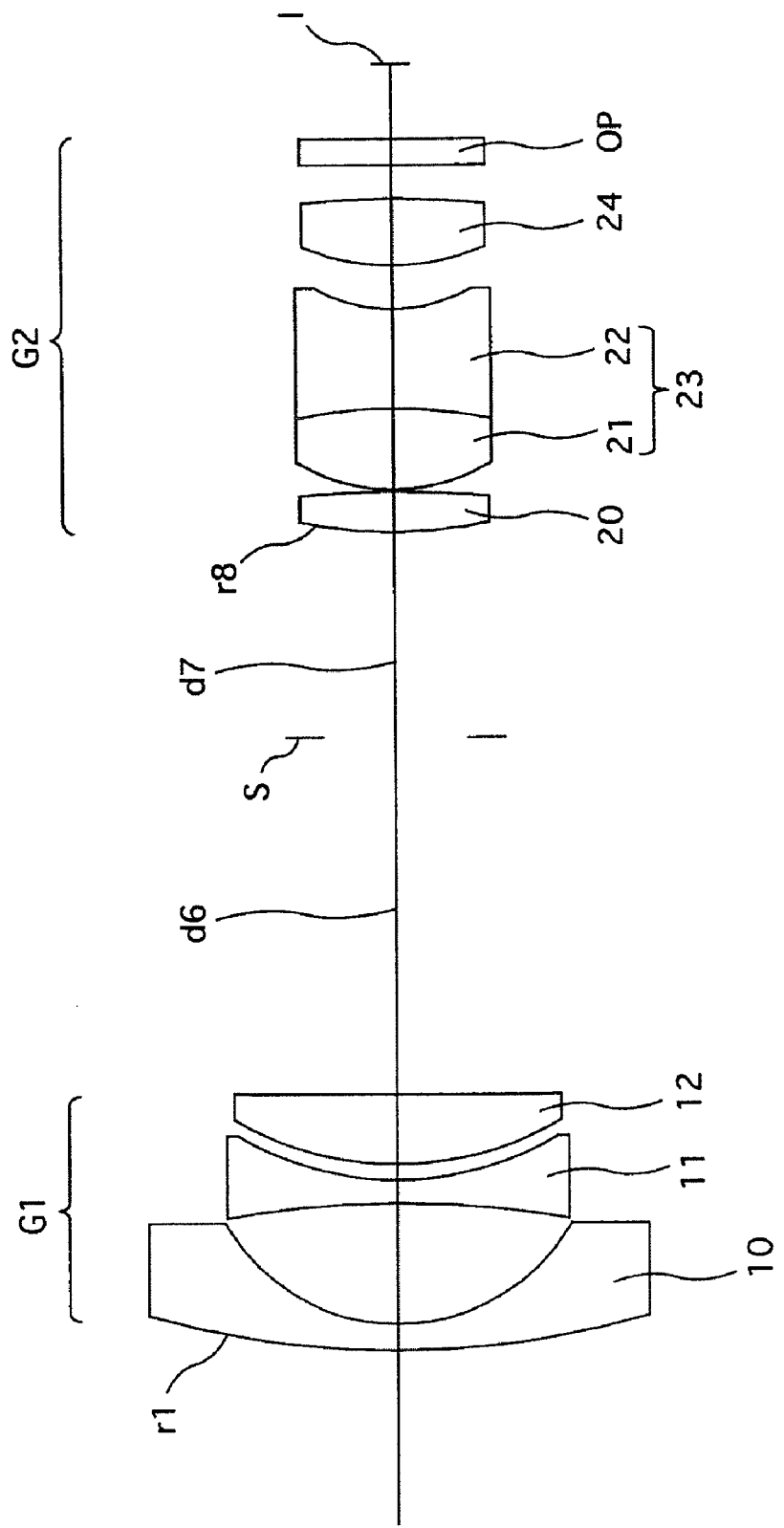
FIG. 1 shows a lens arrangement of a first numerical embodiment of a zoom lens system according to the present invention.
Figure 9:
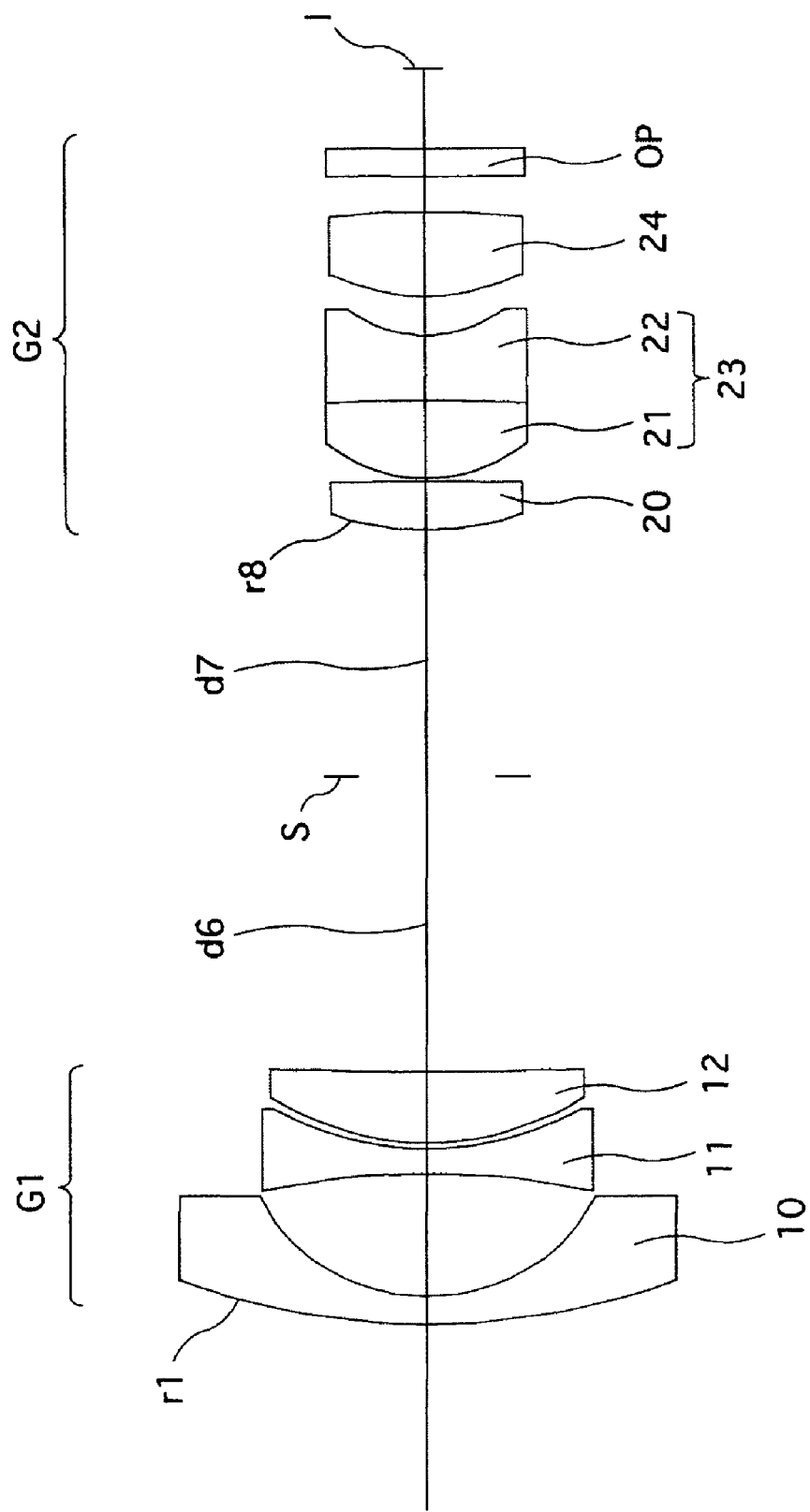
FIG. 9 shows a lens arrangement of a third numerical embodiment of a zoom lens system according to the present invention.

The first lens group G1 is configured of, as shown in FIG. 1 (first numerical embodiment), FIG. 5 (second numerical embodiment) and FIG. 9 (third numerical embodiment), a negative meniscus lens element 10 having a convex surface on the object side, a biconcave negative lens element 11, and a positive meniscus lens element 12 having a convex surface on the object side, in that order from the object side.

The negative meniscus lens element 10 can have an aspherical surface on the image side thereof, as illustrated in the third numerical embodiment.

The second lens group G2 is configured of a biconvex positive lens element 20, a cemented lens 23 formed from a biconvex positive lens element 21 and a biconcave negative lens element 22, and a biconvex positive lens element 24, in that order from the object side. In each of the first through third numerical embodiments, the biconvex positive lens element 24 has an aspherical surface on each side thereof.

The biconvex positive lens element 20 can have an aspherical surface on each side thereof, as shown in the second and third numerical embodiments.

Conventionally, a miniaturized zoom lens system is configured of a negative first lens group and a positive second lens group, in that order from the object side, and such a zoom lens system, in which the distance between the first and second lens groups changes during zooming, is simple in structure and can be miniaturized. In the wide-angle zoom lens system according to the present invention, the minimum number of lens elements for the first lens group 10, in theory, is two lens elements, i.e., a negative lens element and a positive lens element. However, in an arrangement in which the first lens group only consists of two lens elements, a large amount of distortion occurs. Furthermore, arrangements in which four lens elements are employed, which is somewhat large, are common; however, an increase in the thickness (in the optical axis direction from the surface closest to the object side to the surface closest to the image side) of the first lens group is unavoidable, and also the diameter of the first lens group and the overall length of the zoom lens system are increased. Accordingly, in the present invention, the first lens group G1 is configured of three lens elements, i.e., a negative lens element, a negative lens element, and a positive lens element, in that order from the object side. Furthermore, in order to further miniaturize the zoom lens system and control aberration fluctuation, appropriate settings are carried out in regard to the refractive power of the second lens group G2, the shapes of the lenses of the second lens group G2 which are fundamental for aberration correction within the second lens group G2, and the amount of movement in the optical axis direction between the first lens group G1 and the second lens group G2.

Condition (1) specifies the amount of change in distance between the first lens group G1 and the second lens group G2 during zooming. By satisfying condition (1), it becomes possible to achieve a balance between miniaturization of the zoom lens system and aberration fluctuations. If the upper limit of condition (1) is exceeded, the change in distance between the first lens group G1 and the second lens group G2 increases, to thereby increase the overall length of the zoom lens system at the short focal length extremity, so that the zoom lens system cannot be miniaturized. Nevertheless, if the zoom lens system is made smaller, the zoom ratio becomes insufficient and peripheral light collection also becomes insufficient. If the lower limit of condition (1) is exceeded, the amount of change in distance between the first lens group G1 and the second lens group G2 is reduced, however, the various aberrations that occur during zooming, especially fluctuation in spherical aberration, increases, so that aberration correction cannot be sufficiently carried out.

Condition (2) specifies the shape factor of the profile of the positive lens element 20 that is provided closest to the object side within the second lens group G2; hence, aberration fluctuations during zooming can be favourably corrected by satisfying condition (2). If the upper limit of condition (2) is exceeded, the radius of curvature of the surface on the object side of the positive lens element 20 decreases so that spherical aberration cannot be adequately corrected. If the lower limit of condition (2) is exceeded, coma aberration cannot be corrected.

Condition (3) specifies the refractive power setting of the second lens group G2. The amount of movement of the second lens group G2, in particular, can be reduced and further miniaturization can be achieved by satisfying condition (3). If the upper limit of condition (3) is exceeded, since zooming would be performed by a small refractive power, the overall length of the zoom lens system at the short focal length extremity increases so that miniaturization thereof cannot be achieved. Nevertheless, if the zoom lens system is made smaller, the zoom ratio becomes insufficient and peripheral light collection also becomes insufficient. If the lower limit of condition (3) is exceeded, the refractive power of the second lens group G2 becomes too strong, and distortion in particular becomes difficult to correct.

Condition (4) specifies the radius of curvature of the bonding surface of the cemented lens 23 that is provided within the second lens group G2. By satisfying condition (4) so as to provide a divergent (bonding) surface within the second lens group G2, spherical aberration in particular can be favourably corrected. If the upper limit of condition (4) is exceeded, the divergence of the second lens group G2 becomes too strong, spherical aberration is over-corrected, and high-degree aberrations occur. If the lower limit of condition (4) is exceeded, the effect of spherical aberration correction disappears, so that aberration fluctuations during zooming increase.

Condition (5) specifies the difference in Abbe number with respect to the d-line of the cemented lens 23 that is provided in the second lens group G2, and chromatic aberration can be favourably corrected by satisfying condition (5). If the lower limit of condition (5) is exceeded, the chromatic aberration cannot be favourably corrected.

Condition (6) specifies the entire the lens-group thickness (in the optical axis direction from the surface closest to the object side to the surface closest to the image side) of the second lens group G2. If the upper limit of condition (6) is exceeded, the entire lens-group thickness of the second lens group G2 increases, and hence, the overall length of the zoom lens system increases so that miniaturization thereof cannot be achieved. Nevertheless, if the zoom lens system is made smaller, the zoom ratio becomes insufficient and peripheral light collection also becomes insufficient. If the lower limit of condition (6) is exceeded, the number of lens elements of the zoom lens system becomes insufficient (the required number of lens element cannot be provided), and spherical aberration in particular cannot be properly corrected with respect to the f-number.

Condition (7) specifies the ratio of the focal length of the first lens group G1 to the focal length of the second lens group G2. If the upper limit of condition (7) is exceeded, the amount of movement of the first lens group G1 that occurs during zooming increases, so that miniaturization of the zoom lens system cannot be achieved. Nevertheless, if the zoom lens system is made smaller, the zoom ratio becomes insufficient and peripheral light collection also becomes insufficient. If the lower limit of condition (7) is exceeded, the ratio of the negative refractive power of the first lens group G1 with respect to the entire zoom lens system becomes too large, so that negative distortion, in particular, cannot be properly corrected.

[EMBODIMENTS]

Specific numerical embodiments will be herein discussed. The following numerical embodiments are applied to an embodiment of a zoom lens system used in a miniaturized surveillance camera. In the aberration diagrams and the tables, the d-line, g-line and C-line show aberrations at their respective wavelengths; S designates the sagittal image, M designates the meridional image, Fno. designates the f-number, f designates the focal length of the entire optical system, W designates the half angle of view (°), Y designates the image height, fB designates the backfocus, L designates the overall length of the lens system, R designates the radius of curvature, d designates the lens thickness or distance between lenses, N (d) designates the refractive index at the d-line, and vd designates the Abbe number with respect to the d-line. The values for the f-number, the focal length, the half angle-of-view, the image height, the backfocus, the overall length of the lens system, and the distance between lenses (which changes during zooming and according to the overall length of the lens system) are shown in the following order: short focal length extremity, intermediate focal length, and long focal length extremity.

An aspherical surface which is rotationally symmetrical about the optical axis is defined as:

$$x = cy^2/(1+[1-\{1+K\}c^2y^2]^{1/2}) + A4y^4 + A6y^6 + A8y^8 + A10y^{10} + A12y^{12}$$

wherein 'x' designates a distance from a tangent plane of the aspherical vertex, 'c' designates the curvature (1/r) of the aspherical vertex, 'y' designates the distance from the optical axis, 'K' designates the conic coefficient, A4 designates a fourth-order aspherical coefficient, A6 designates a sixth-order aspherical coefficient, A8 designates an eighth-order aspherical coefficient, A10 designates a tenth-order aspherical coefficient, and A12 designates a twelfth-order aspherical coefficient.

[Embodiment 1]

FIGS. 1 through 4D and Tables 1 through 4 show a first numerical embodiment of a zoom lens system according to the present invention. FIG. 1 shows a lens arrangement of the first numerical embodiment. FIGS. 2A, 2B, 2C and 2D show various aberrations that occurred in the lens arrangement shown in FIG. 1 at the short focal length extremity when focused on an object at infinity. FIGS. 3A, 3B, 3C and 3D show various aberrations that occurred in the lens arrangement shown in FIG. 1 at an intermediate focal length when focused on an object at infinity. FIGS. 4A, 4B, 4C and 4D show various aberrations that occurred in the lens arrangement shown in FIG. 1 at the long focal length extremity when focused on an object at infinity. Table 1 shows the lens surface data, Table 2 shows the aspherical surface data, Table 3 shows various zoom lens system data, and Table 4 shows the lens group data of the zoom lens system according to first numerical embodiment.

The zoom lens system according to the first numerical embodiment is configured of a negative first lens group G1, a diaphragm S, a positive second lens group G2, in that order from the object side.

The first lens group G1 (surface Nos. 1 through 6) is configured of a negative meniscus lens element 10 having a convex surface on the object side, a biconcave negative lens element 11, and a positive meniscus lens element 12 having a convex surface on the object side, in that order from the object side.

The second lens group G2 (surface Nos. 8 through 14) is configured of a biconvex positive lens element 20, a cemented lens 23 that is formed from a biconvex positive lens element 21 and a biconcave negative lens element 22, and a biconvex positive lens element 24, in that order from the object side. The biconvex positive lens element 24 has an aspherical surface on each side thereof.

The position of the diaphragm S (surface No. 7), which is provided between the first lens group G1 and the second lens group G2, remains at a fixed (stationary) position on the optical axis so that the distance from the diaphragm S to the position of the image plane I does not change. Furthermore, the diaphragm S is controlled so that the mechanical open-diaphragm diameter at the short focal length extremity is larger than the mechanical open-diaphragm diameter at the other zoom regions.

An optical filter OP (surface Nos. 15 and 16) is provided behind the second lens group (the biconvex positive lens element 24) G2 (in between the second lens group G2 and the image plane I).

TABLE 1

| LENS SURFACE DATA | | | | |
|---|---|---|---|---|
| Surf. No. | R | d | N(d) | vd |
| 1 | 35.312 | 1.000 | 1.78800 | 47.5 |
| 2 | 7.675 | 4.590 | | |
| 3 | −38.676 | 0.900 | 1.77250 | 49.6 |
| 4 | 12.038 | 0.607 | | |
| 5 | 12.590 | 2.652 | 1.80518 | 25.5 |
| 6 | 1010.743 | d6 | | |
| 7(Diaphragm) | ∞ | d7 | | |
| 8 | 17.929 | 1.520 | 1.77250 | 49.6 |
| 9 | −38.828 | 0.100 | | |
| 10 | 7.264 | 3.105 | 1.54814 | 45.8 |
| 11 | −17.611 | 3.800 | 1.84666 | 23.8 |
| 12 | 6.274 | 1.651 | | |
| 13 * | 8.897 | 2.529 | 1.70000 | 54.2 |
| 14 * | −26.122 | 1.260 | | |
| 15 | ∞ | 1.000 | 1.51680 | 64.2 |
| 16 | ∞ | — | | |

The asterisk (*) designates an aspherical surface which is rotationally symmetrical with respect to the optical axis.

TABLE 2

| ASPHERICAL SURFACE DATA (aspherical surface coefficients not indicated are zero (0.00)): | | | | | | |
|---|---|---|---|---|---|---|
| Surf. No. | K | A4 | A6 | A8 | A10 | A12 |
| 13 | 0.516 | −0.1547 × 10⁻³ | 0.6990 × 10⁻⁵ | −0.1918 × 10⁻⁵ | 0.6945 × 10⁻⁷ | 0.5570 × 10⁻⁹ |
| 14 | 29.412 | 0.5734 × 10⁻³ | −0.1424 × 10⁻⁴ | 0.6845 × 10⁻⁵ | −0.7400 × 10⁻⁶ | 0.2650 × 10⁻⁷ |

TABLE 3

| ZOOM LENS SYSTEM DATA | | | |
|---|---|---|---|
| Zoom Ratio 2.86 | | | |
| | Short Focal Length Extremity | Intermediate Focal Length | Long Focal Length Extremity |
| $F_{NO.}$ | 1.9 | 2.2 | 3.2 |
| f | 3.50 | 5.90 | 10.00 |
| W | 58.4 | 33.1 | 19.4 |
| Y | 3.40 | 3.40 | 3.40 |
| fB | 5.72 | 8.24 | 12.55 |
| L | 51.92 | 42.25 | 39.27 |
| d6 | 13.647 | 3.976 | 0.994 |
| d7 | 7.837 | 5.315 | 1.007 |

TABLE 4

| LENS GROUP DATA | | |
|---|---|---|
| Lens Group | 1st Surf. | Focal Length |
| 1 | 1 | −9.99 |
| 2 | 8 | 10.50 |

[Embodiment 2]

FIGS. 5 through 8D and Tables 5 through 8 show a second numerical embodiment of a zoom lens system according to the present invention. FIG. 5 shows a lens arrangement of the second numerical embodiment. FIGS. 6A, 6B, 6C and 6D show various aberrations that occurred in the lens arrangement shown in FIG. 5 at the short focal length extremity when focused on an object at infinity. FIGS. 7A, 7B, 7C and 7D show various aberrations that occurred in the lens arrangement shown in FIG. 5 at an intermediate focal length when focused on an object at infinity. FIGS. 8A, 8B, 8C and 8D show various aberrations that occurred in the lens arrangement shown in FIG. 5 at the long focal length extremity when focused on an object at infinity. Table 5 shows the lens surface data, Table 6 shows the aspherical surface data, Table 7 shows various zoom lens system data, and Table 8 shows the lens group data of the zoom lens system according to second numerical embodiment.

The lens arrangement of the second numerical embodiment is the same as that of the first numerical embodiment except for the biconvex positive lens element 20 of the second lens group G2 having an aspherical surface on each side thereof.

TABLE 5

| LENS SURFACE DATA | | | | |
|---|---|---|---|---|
| Surf. No. | R | d | N(d) | vd |
| 1 | 25.785 | 0.800 | 1.81600 | 46.6 |
| 2 | 6.888 | 4.325 | | |
| 3 | −60.025 | 0.800 | 1.75700 | 47.7 |
| 4 | 11.183 | 0.469 | | |
| 5 | 10.702 | 2.376 | 1.84666 | 23.8 |
| 6 | 49.256 | d6 | | |
| 7(Diaphragm) | ∞ | d7 | | |
| 8 * | 13.527 | 1.619 | 1.65000 | 60.7 |
| 9 * | −35.528 | 0.100 | | |
| 10 | 6.638 | 2.434 | 1.51742 | 52.2 |
| 11 | −56.869 | 3.533 | 1.80518 | 25.5 |
| 12 | 5.386 | 1.424 | | |
| 13 * | 8.198 | 2.517 | 1.61545 | 59.5 |
| 14 * | −21.145 | 1.260 | | |
| 15 | ∞ | 1.000 | 1.51680 | 64.2 |
| 16 | ∞ | — | | |

The asterisk (*) designates an aspherical surface which is rotationally symmetrical with respect to the optical axis.

TABLE 6

| ASPHERICAL SURFACE DATA (aspherical surface coefficients not indicated are zero (0.00)): | | | | | | |
|---|---|---|---|---|---|---|
| Surf. No. | K | A4 | A6 | A8 | A10 | A12 |
| 8 | −0.394 | $-0.1280 \times 10^{-3}$ | $-0.6416 \times 10^{-5}$ | $-0.1151 \times 10^{-5}$ | $0.8412 \times 10^{-7}$ | $-0.4247 \times 10^{-9}$ |
| 9 | 1.094 | $-0.5724 \times 10^{-4}$ | $-0.1788 \times 10^{-4}$ | $0.7279 \times 10^{-6}$ | $-0.4153 \times 10^{-7}$ | $0.2250 \times 10^{-8}$ |
| 13 | 0.164 | $-0.4773 \times 10^{-3}$ | $-0.2736 \times 10^{-4}$ | $-0.7760 \times 10^{-6}$ | $-0.2677 \times 10^{-7}$ | $-0.8824 \times 10^{-9}$ |
| 14 | 19.785 | $0.2837 \times 10^{-3}$ | $-0.2564 \times 10^{-4}$ | $0.4840 \times 10^{-5}$ | $-0.6551 \times 10^{-6}$ | $0.2301 \times 10^{-7}$ |

TABLE 7

| ZOOM LENS SYSTEM DATA | | | |
|---|---|---|---|
| Zoom Ratio 3.00 | | | |
| | Short Focal Length Extremity | Intermediate Focal Length | Long Focal Length Extremity |
| $F_{NO.}$ | 1.9 | 2.3 | 3.5 |
| f | 3.50 | 6.10 | 10.50 |
| W | 57.2 | 31.9 | 18.5 |
| Y | 3.40 | 3.40 | 3.40 |
| fB | 5.84 | 8.58 | 13.24 |
| L | 48.42 | 39.78 | 38.01 |
| d6 | 11.528 | 2.894 | 1.124 |
| d7 | 8.398 | 5.650 | 0.999 |

TABLE 8

| LENS GROUP DATA | | |
|---|---|---|
| Lens Group | 1st Surf. | Focal Length |
| 1 | 1 | −9.40 |
| 2 | 8 | 9.94 |

[Embodiment 3]

FIGS. 9 through 12D and Tables 9 through 12 show a third numerical embodiment of a zoom lens system according to the present invention. FIG. 9 shows a lens arrangement of the third numerical embodiment. FIGS. 10A, 10B, 10C and 10D show various aberrations that occurred in the lens arrangement shown in FIG. 9 at the short focal length extremity when focused on an object at infinity. FIGS. 11A, 11B, 11C and 11D show various aberrations that occurred in the lens arrangement shown in FIG. 9 at an intermediate focal length when focused on an object at infinity. FIGS. 12A, 12B, 12C and 12D show various aberrations that occurred in the lens arrangement shown in FIG. 9 at the long focal length extremity when focused on an object at infinity. Table 9 shows the lens surface data, Table 10 shows the aspherical surface data, Table 11 shows various zoom lens system data, and Table 12 shows the lens group data of the zoom lens system according to third numerical embodiment.

The lens arrangement of the third numerical embodiment is the same as that of the first numerical embodiment except for the negative meniscus lens element 10 of the first lens group G1 having an aspherical surface on the image side and for the biconvex positive lens element 20 of the second lens group G2 having an aspherical surface on each side thereof.

TABLE 9

LENS SURFACE DATA

| Surf. No. | R | d | N(d) | νd |
|---|---|---|---|---|
| 1 | 26.365 | 1.000 | 1.83400 | 42.6 |
| 2 * | 7.400 | 4.365 | | |
| 3 | −28.901 | 0.900 | 1.77250 | 49.6 |
| 4 | 11.430 | 0.211 | | |
| 5 | 10.552 | 2.545 | 1.80518 | 25.5 |
| 6 | 157.222 | d6 | | |
| 7(Diaphragm) | ∞ | d7 | | |
| 8 * | 11.659 | 1.737 | 1.65000 | 60.7 |
| 9 * | −45.000 | 0.100 | | |
| 10 | 5.830 | 2.796 | 1.54072 | 47.2 |
| 11 | −67.695 | 2.356 | 1.84666 | 23.8 |
| 12 | 4.774 | 1.393 | | |
| 13 * | 7.300 | 3.000 | 1.61845 | 49.5 |
| 14 * | −34.774 | 1.260 | | |
| 15 | ∞ | 1.000 | 1.51680 | 64.2 |
| 16 | ∞ | — | | |

The asterisk (*) designates an aspherical surface which is rotationally symmetrical with respect to the optical axis.

TABLE 10

ASPHERICAL SURFACE DATA (aspherical surface coefficients not indicated are zero (0.00)):

| Surf. No. | K | A4 | A6 | A8 | A10 | A12 |
|---|---|---|---|---|---|---|
| 2 | 0.301 | $-0.3989 \times 10^{-4}$ | $0.4775 \times 10^{-6}$ | $0.4889 \times 10^{-8}$ | $-0.1621 \times 10^{-9}$ | $-0.1106 \times 10^{-10}$ |
| 8 | −0.649 | $0.1040 \times 10^{-3}$ | $0.2872 \times 10^{-4}$ | $-0.1275 \times 10^{-5}$ | $0.5313 \times 10^{-7}$ | $0.3757 \times 10^{-8}$ |
| 9 | 2.519 | $0.2075 \times 10^{-3}$ | $0.1712 \times 10^{-4}$ | $0.9875 \times 10^{-6}$ | $-0.1187 \times 10^{-6}$ | $0.1011 \times 10^{-7}$ |
| 13 | 0.231 | $-0.3215 \times 10^{-3}$ | $-0.4854 \times 10^{-4}$ | $0.2656 \times 10^{-5}$ | $-0.2312 \times 10^{-8}$ | $-0.7586 \times 10^{-8}$ |
| 14 | 33.634 | $0.3157 \times 10^{-3}$ | $-0.2655 \times 10^{-4}$ | $0.5209 \times 10^{-5}$ | $-0.6593 \times 10^{-6}$ | $0.2596 \times 10^{-7}$ |

TABLE 11

ZOOM LENS SYSTEM DATA
Zoom Ratio 3.20

| | Short Focal Length Extremity | Intermediate Focal Length | Long Focal Length Extremity |
|---|---|---|---|
| $F_{NO.}$ | 1.9 | 2.3 | 3.8 |
| f | 3.50 | 6.30 | 11.20 |
| W | 62.8 | 31.4 | 17.4 |
| Y | 3.40 | 3.40 | 3.40 |
| fB | 5.14 | 7.99 | 12.98 |
| L | 47.22 | 38.82 | 37.66 |
| d6 | 10.571 | 2.173 | 1.012 |
| d7 | 8.843 | 5.991 | 0.999 |

TABLE 12

LENS GROUP DATA

| Lens Group | 1$^{st}$ Surf. | Focal Length |
|---|---|---|
| 1 | 1 | −9.33 |
| 2 | 8 | 9.50 |

The numerical values of each condition for each numerical embodiment are shown in Table 13.

TABLE 13

| | Embod. 1 | Embod. 2 | Embod. 3 |
|---|---|---|---|
| Cond. (1) | 6.82 | 5.93 | 5.44 |
| Cond. (2) | 0.37 | 0.45 | 0.59 |
| Cond. (3) | 3.00 | 2.84 | 2.71 |
| Cond. (4) | 0.06 | 0.02 | 0.02 |

TABLE 13-continued

| | Embod. 1 | Embod. 2 | Embod. 3 |
|---|---|---|---|
| Cond. (5) | 22.0 | 27.0 | 25.1 |
| Cond. (6) | 3.63 | 3.32 | 3.25 |
| Cond. (7) | 0.95 | 0.95 | 0.98 |

As can be understood from Table 13, the first through third numerical embodiments satisfy conditions (1) through (7). Furthermore, as can be understood from the aberration diagrams, the various aberrations are suitably corrected.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A zoom lens system comprising a negative first lens group, a diaphragm, and a positive second lens group, in that order from the object side,
    wherein upon zooming from the short focal length extremity to the long focal length extremity, said first lens group and said second lens group move in the optical axis direction while decreasing the distance therebetween,
    wherein said first lens group includes a negative lens element, a negative lens element and a positive lens element, in that order from the object side,
    wherein said second lens group includes a positive lens element, a cemented lens that is formed from a positive lens element and a negative lens element, and a positive lens element, in that order from the object side, and
    wherein the following conditions (1) and (2) are satisfied:

$$5.2 < (d12W - d12T)/(mT/mW) < 7 \qquad (1),$$

and $$0.3 < SF < 0.7 \qquad (2),$$

wherein d12W designates the distance along the optical axis from the surface closest to the image side of said first lens group to the surface closest to the object side of said second lens group, at the short focal length extremity,
d12T designates the distance along the optical axis from the surface closest to the image side of said first lens group to the surface closest to the object side of said second lens group, at the long focal length extremity,
mT designates the lateral magnification of said second lens group at the long focal length extremity,
mW designates the lateral magnification of said second lens group at the short focal length extremity, SF designates the shape factor of the positive lens element that is provided closest to the object side within the second lens group, $$SF=(R2+R1)/(R2-R1),$$

R2 designates the radius of curvature of the surface on the image side of the positive lens element that is provided closest to the object side within said second lens group, and R1 designates the radius of curvature of the surface on the object side of the positive lens element that is provided closest to the object side within said second lens group.

2. The zoom lens system according to claim 1, wherein the following condition (3) is satisfied:

$$2.5<f2G/fW<3.2 \quad (3),$$

wherein f2G designates the focal length of said second lens group, and fW designates the focal length of the entire said zoom lens system at the short focal length extremity.

3. The zoom lens system according to claim 1, wherein the following conditions (4) and (5) are satisfied:

$$0<fW/fc<0.1 \quad (4);$$

and $$15<\nu P-\nu N \quad (5),$$

wherein fW designates the focal length of the entire said zoom lens system at the short focal length extremity, $$fc=rc/(nP-nN),$$

rc designates the radius of curvature of the bonding surface of the cemented lens which is provided in said second lens group, nP designates the refractive index at the d-line of the positive lens element of said cemented lens which is provided in said second lens group, nN designates the refractive index at the d-line of the negative lens element of said cemented lens which is provided in said second lens group, νP designates the Abbe number with respect to the d-line of the positive lens element of said cemented lens which is provided in said second lens group, and νN designates the Abbe number with respect to the d-line of the negative lens element of said cemented lens which is provided in said second lens group.

4. The zoom lens system according to claim 1, wherein the following condition (6) is satisfied:

$$3<\Sigma d2G/fW<4 \quad (6),$$

wherein

Σd2G designates the distance along optical axis from the surface closest to the object side of the second lens group to the surface closest to the image side of the second lens group, and fW designates the focal length of the entire said zoom lens system at the short focal length extremity.

5. The zoom lens system according to claim 1, wherein said diaphragm is provided at a fixed location on the optical axis so as to remain stationary without changing the distance between the image plane and said diaphragm during zooming.

6. The zoom lens system according to claim 1, wherein the second negative lens element from the object side of said first lens group comprises a biconcave negative lens element.

7. The zoom lens system according to claim 1, wherein the following condition (7) is satisfied:

$$0.8<|f1G|/f2G<1.2 \quad (7),$$

wherein f1G designates the focal length of said first lens group, and f2G designates the focal length of said second lens group.

\* \* \* \* \*